US006188993B1

(12) United States Patent
Eng et al.

(10) Patent No.: US 6,188,993 B1
(45) Date of Patent: Feb. 13, 2001

(54) SYSTEM AND METHOD FOR CREATING AND MANAGING A SYNTHETIC CURRENCY

(75) Inventors: Alvin Eng, New York, NY (US); Curtis Brill, London (GB)

(73) Assignee: Citibank, N.A., New York, NY (US)

( * ) Notice: Under 35 U.S.C. 154(b), the term of this patent shall be extended for 0 days.

(21) Appl. No.: 08/840,133

(22) Filed: Apr. 11, 1997

Related U.S. Application Data

(60) Provisional application No. 60/015,542, filed on Apr. 12, 1996.

(51) Int. Cl.[7] .................................................. G06F 17/60
(52) U.S. Cl. ................................................ 705/37; 705/35
(58) Field of Search ................................. 705/35, 36, 37

(56) References Cited

U.S. PATENT DOCUMENTS

| | | | |
|---|---|---|---|
| 4,597,046 | 6/1986 | Musmanno et al. | 364/408 |
| 4,694,397 | 9/1987 | Grant et al. | 364/408 |
| 4,742,457 | 5/1988 | Leon et al. | 364/408 |
| 4,823,264 | 4/1989 | Deming | 364/408 |
| 4,910,676 | 3/1990 | Alldredge | 364/408 |

(List continued on next page.)

OTHER PUBLICATIONS

"Can We Improve the Structure of the Financial Systems?" Joseph Schumpter Lecture by Charles Goodhart (London School of Economics & Political Science), European Economics Review, 1983.
Denationalisation of Money —The Argument Refined (An Analysis of the Theory and Practice of Concurrent Currencies), F.A. Hayek, Institute of Economics & Affairs, 1978.
"Monetary Nationalism and International Stability," F.A. Hayek, Reprints of Economics Classics, 1971.
1. "The Rise of Electronic Payments Networks and the Future Role of the Fed with Regard to Payment Finality." .
2. "Beyond Duration: Measuring Interest Rate Exposure." .
3. "FYI—The Use of Mitigating Factors in Bank Mergers and Acquisitions: A Decade of Antitrust at the Fed." . 4. "Policy Essay—New Tools for Regulators in a High–Tech World." Federal Reserve Bank of Atlanta, Economic Review, Mar./Apr. 1993.
"Evaluating and Controlling the Risks of Financial Product Deregulation," Robert E. Litan, Yale Journal of Regulation, Fall 1985.
"Risk Return, and Equilibrium: Empirical Tests," Eugene F. Fama and James D. MacBeth, Journal of Political Economy, May/Jun. 1973.

(List continued on next page.)

*Primary Examiner*—Frantzy Poinvil
(74) *Attorney, Agent, or Firm*—Hunton & Williams

(57) ABSTRACT

A synthetic currency transaction network which performs transactions with near real time finality of transaction between potential borrowers and potential lenders. Synthetic currency is created by pooling and dividing into shares a portfolio of highly liquid assets and frequent evaluation and disbursements of dividends on those assets so as to hold the value of the synthetic currency share at unity with the underlying currency. The synthetic currency network provides for interfacing users to the synthetic currency transaction network. A database is used for storing and maintaining records and other information of the network. A transaction manager manages network users' accounts and all network transactions. A fund accountant manages network information regarding the synthetic currency. A deposit bank acts as custodian for the portfolio of highly liquid assets which underlie the synthetic currency. An investment manager manages the measure of synthetic currency and directs investment decisions. A loan accountant manages all lending and borrowing activities in the synthetic currency transaction network.

48 Claims, 4 Drawing Sheets

U.S. PATENT DOCUMENTS

| | | | |
|---|---|---|---|
| 4,953,085 | 8/1990 | Atkins | 364/408 |
| 5,063,507 | 11/1991 | Lindsey et al. | 364/408 |
| 5,083,782 | 1/1992 | Nilssen | 273/138 R |
| 5,126,936 | 6/1992 | Champion et al. | 364/408 |
| 5,175,416 | 12/1992 | Mansvelt et al. | 235/379 |
| 5,206,803 | 4/1993 | Vitagliano et al. | 364/408 |
| 5,237,500 | 8/1993 | Perg et al. | 364/408 |
| 5,262,942 | 11/1993 | Earle | 364/408 |
| 5,285,383 | 2/1994 | Lindsey et al. | 364/408 |
| 5,323,315 | 6/1994 | Highbloom | 364/408 |
| 5,455,407 | 10/1995 | Rosen | 235/380 |

OTHER PUBLICATIONS

"Pricing Isn't Everything," Economic Commentary, Federal Reserve Bank of Cleveland, Apr. 1993.

"Starting a Business within a Business," Eileen Bedell (Bankers Trust), Working Woman, Feb. 1993.

"Getty Thinks There's a Buck in Mutual Funds," Tim W. Ferguson (Business World), reprinted in The Wall Street Journal, Tuesday, Mar. 2, 1993.

"The Pretence of Knowledge—Nobel Memorial Lecture, Dec. 11, 1974," F. A. Hayek, The American Economic Review, Dec. 1989.

"Payments Systems: Increased Market Share for the Private Sector," Fernando S. David, Economist.

"The Dangers of Letting Banks own Everything," Robert E. Litan, The Wall Street Journal, Tuesday, Feb. 5, 1991.

"Financial Information: Moving Markets," The Information Payoff.

"What to do About Banks—(Books),"David Fairlamb, International Investor.

"Bank Failures are Sinking the FDIC," James R. Barth, R. Dan Brumbaugh, Jr., and Robert Litan; Challenge; Mar./Apr. 1991.

"Banking in the Theory of Finance," Eugene F. Fama, Journal of Monetary Economics 6, 1980.

"Business Conditions and Expected Returns on Stocks and Bonds," Eugene F. Fama and Kenneth R. French, Journal of Financial Economics 25, 1989.

"Contract Costs and Financing Decisions," Eugene F. Fama, Journal of Business, 1990.

"Banking Revolution Won't Wait for Congress," Robert E. Litan, Nov. 1987.

"Efficient Capital Markets: II," Eugene F. Fama, The Journal of Finance, Dec. 1991.

"Facing Up to the Crisis in American Banking," R. Dan Brumbaugh, Jr. and Robert E. Litan, The Brookings Review, Winter 1988/1989.

"Financial Intermediation and Price Level Control," Eugene F Fama, Journal of Monetary Economics 12, 1983.

"Ignoring Economics in Dealing with the Savings and Loan and Commerical Banking Crisis," R. Dan Brumbaugh, Jr. and Robert E. Litan, Contemporary Policy Issues, Jan. 1991.

"Moving Beyond the Stalemate Over," Robert E. Litan, American Banker, 1986.

"Organizational Forms and Investment Decision," Eugene F. Fama and Michael C. Jensen, Journal of Financial Economics 14, 1985.

"Separation of Ownership and Control," Eugene F. Fama and Michael C. Jensen, Journal of Law & Economics, Jun. 1983.

"Session Topic: Individual Investors and Mutual Funds; From Theory to a New Financial Product," Fischer Black and Myron Scholes, The Journal of Finance, May 1974.

"Stock Returns, Expected Returns, and Real Activity," Eugene F. Fama, The Journal of Finance, Sep. 1990.

"The Banks Are Worse Off Than You Think," R. Dan Brumbaugh, Jr., and Robert E. Litan, Challenge, Jan./Feb. 1990.

"The Conduct of Monetary Policy," Charles Goodhart, The Economic Journal 99, Jun. 1989.

"What's Different About Banks?" Eugene F. Fama, Journal of Monetary Economics 15, 1985.

SYSTEM AND METHOD FOR CREATING AND MANAGING A SYNTHETIC CURRENCY

CROSS REFERENCE TO RELATED APPLICATIONS

This invention claims the benefit of U.S. Provisional Application No. 60/015,542, filed Apr. 12, 1996.

BACKGROUND OF THE INVENTION

This invention relates to a transaction network for a synthetic currency (commercially designated as Inside Money). More specifically, this invention relates to alternatives to cash transactions which allow users of the transaction network to conduct electronic currency transactions in a 24-hour international network creating a virtual central bank with near real-time finality of transaction. Synthetic currency is created by pooling and dividing into shares a portfolio of highly liquid assets and by frequent evaluation and disbursement of dividends on those assets so as to hold the value of the synthetic currency share at unity with the underlying currency.

Current methods of cash transactions involve the transfer of cash by using notes or draft instruments. A holder of an instrument must present this instrument to another or a financial institution for payment. The bank, in the case of a check, will verify sufficient funds and then pay cash to the holder and debit the drawee's account accordingly. Electronic debiting and credit means exist. However, such systems do not provide finality for their transaction or accrue interest. Currently, electronic transfer means have no finality for interest based assets. For example, if there are insufficient funds in the drawee's account, the holder will then have to go back to the drawee to demand payment of the check before he can receive cash. Thus, in current transactions, finality of transaction does not exist at the time of transfer of the instrument or token of value. Similarly in stock or mutual fund transfers, current transaction networks include transaction delays because transactions must pass through multiple banking systems before payment finality is achieved. Such delays also prevent cash or currency assets from earning interest for the holder while the cash or currency is transferred to the proper account. There is no current cash or currency exchange network that continuously pays the holder of cash or currency assets a market interest rate.

Currently, potential lenders and potential borrowers of currency must go through intermediaries to identify each other. Once this occurs, the two parties are able to then conduct a transaction between themselves. However, current systems have no means of allowing potential lenders and potential borrowers to obtain real-time transaction based information regarding credit ratings of the other party prior to the transaction.

In current systems, since cash or currency is liquidated during a transaction, current cash or currency assets cannot continuously pay interest throughout the entire transaction.

SUMMARY OF THE INVENTION

The Inside Money (IM) network is a managed network for synthetic currency trading and lending. Two major advantages of the synthetic currency network are near real-time finality of settlement and continuous interest on the instrument of trade. The IM network includes the following major components, a transfer agent, fund accountant, investment advisor, custodian, shareholder service agent, database, and loan accountant.

The complete IM system permits users to buy and sell mutual fund shares, or notes from a pool of such shares. This saves the users the transaction cost associated with the direct issuance and transfer of mutual fund shares. IM conducts a net transaction with the mutual fund to reconcile the pool with the share demand. These shares are also available for lending. These in combination allows the IM network to pay a higher return on the mutual fund share than the mutual fund alone.

DESCRIPTION OF THE PREFERRED EMBODIMENT

Figure 1:
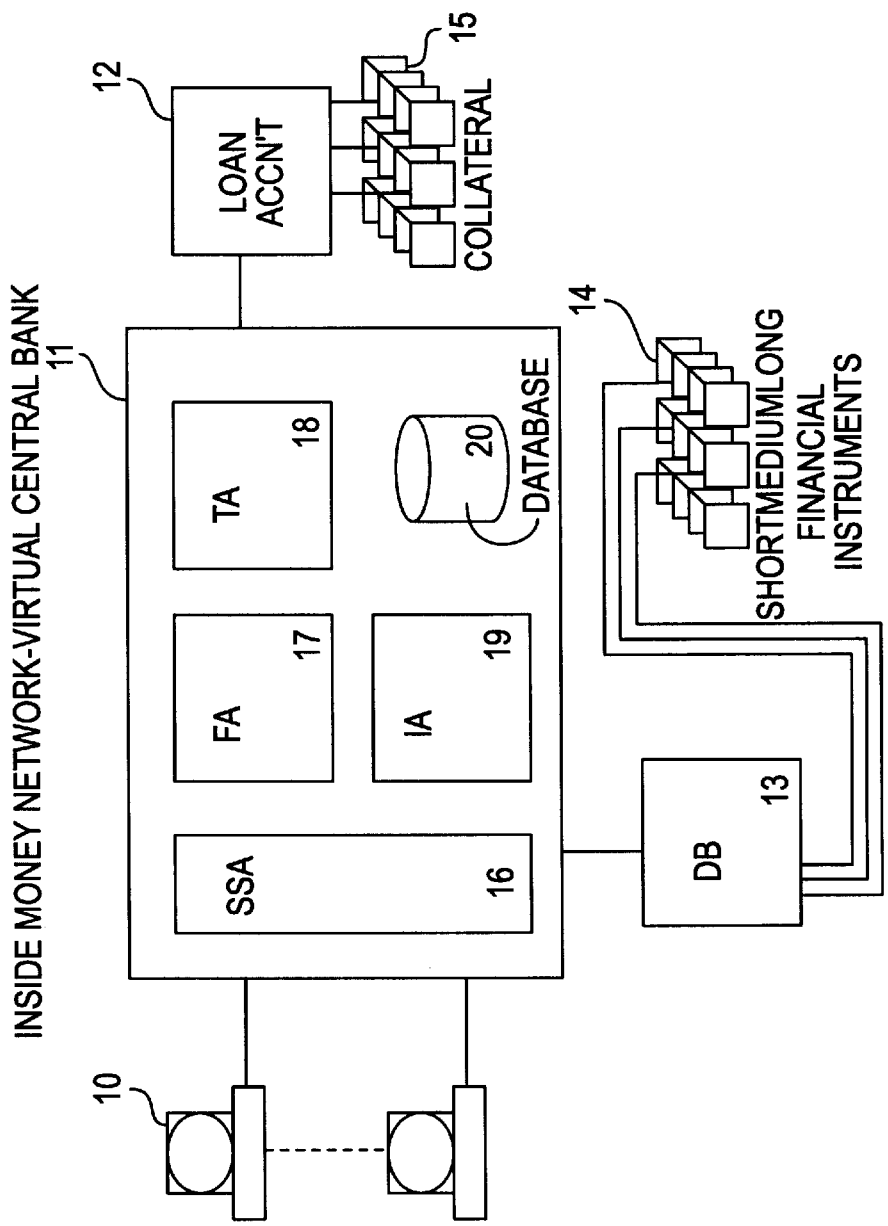
FIG. 1 is a diagram of the Inside Money synthetic currency network showing user workstations, shareholder service agent, fund accountant, investment advisor, transfer agent, loan accountant, and deposit bank.
Figure 2:
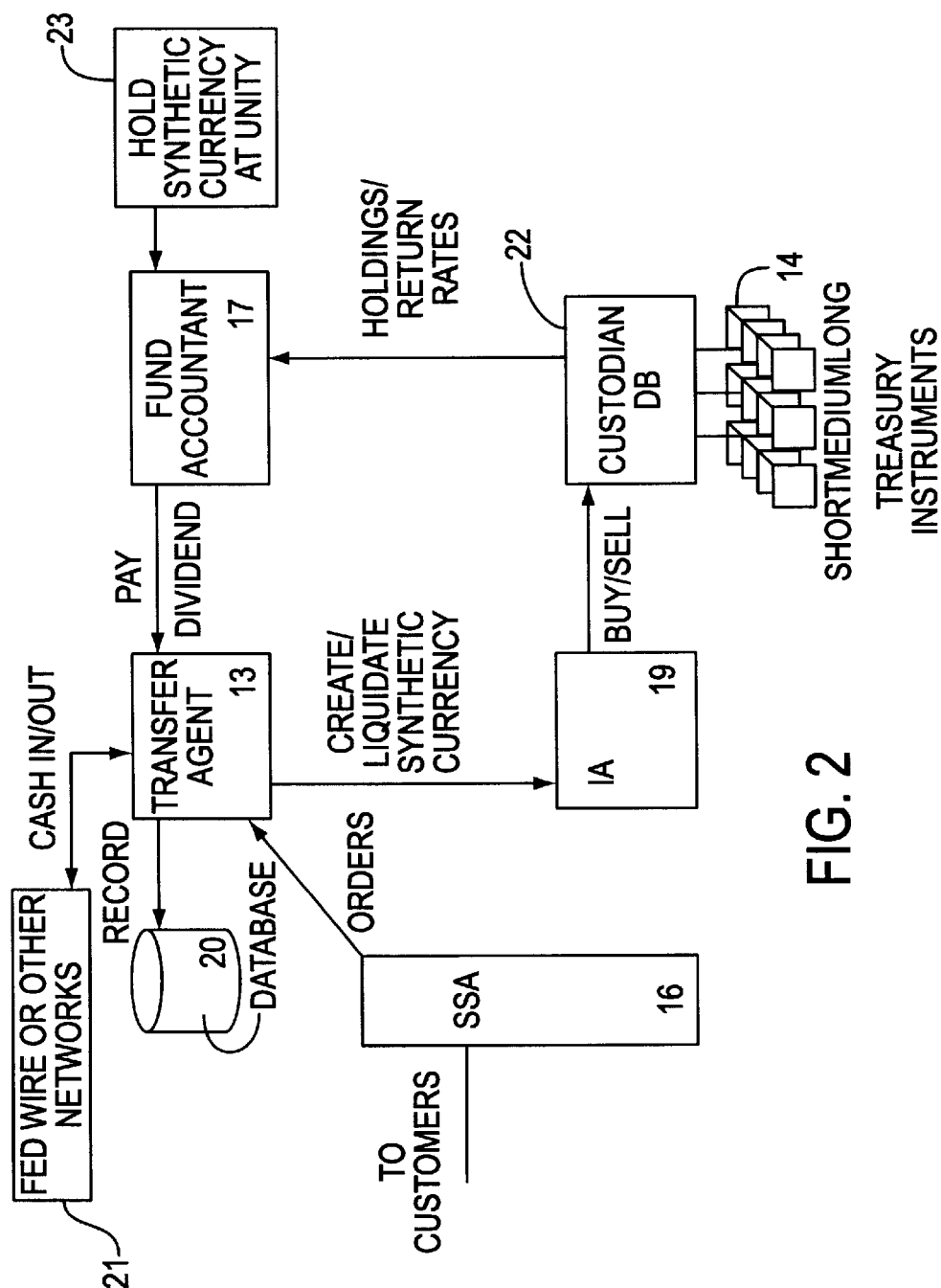
FIG. 2 is a diagram of the interconnections between network components.
Figure 3:
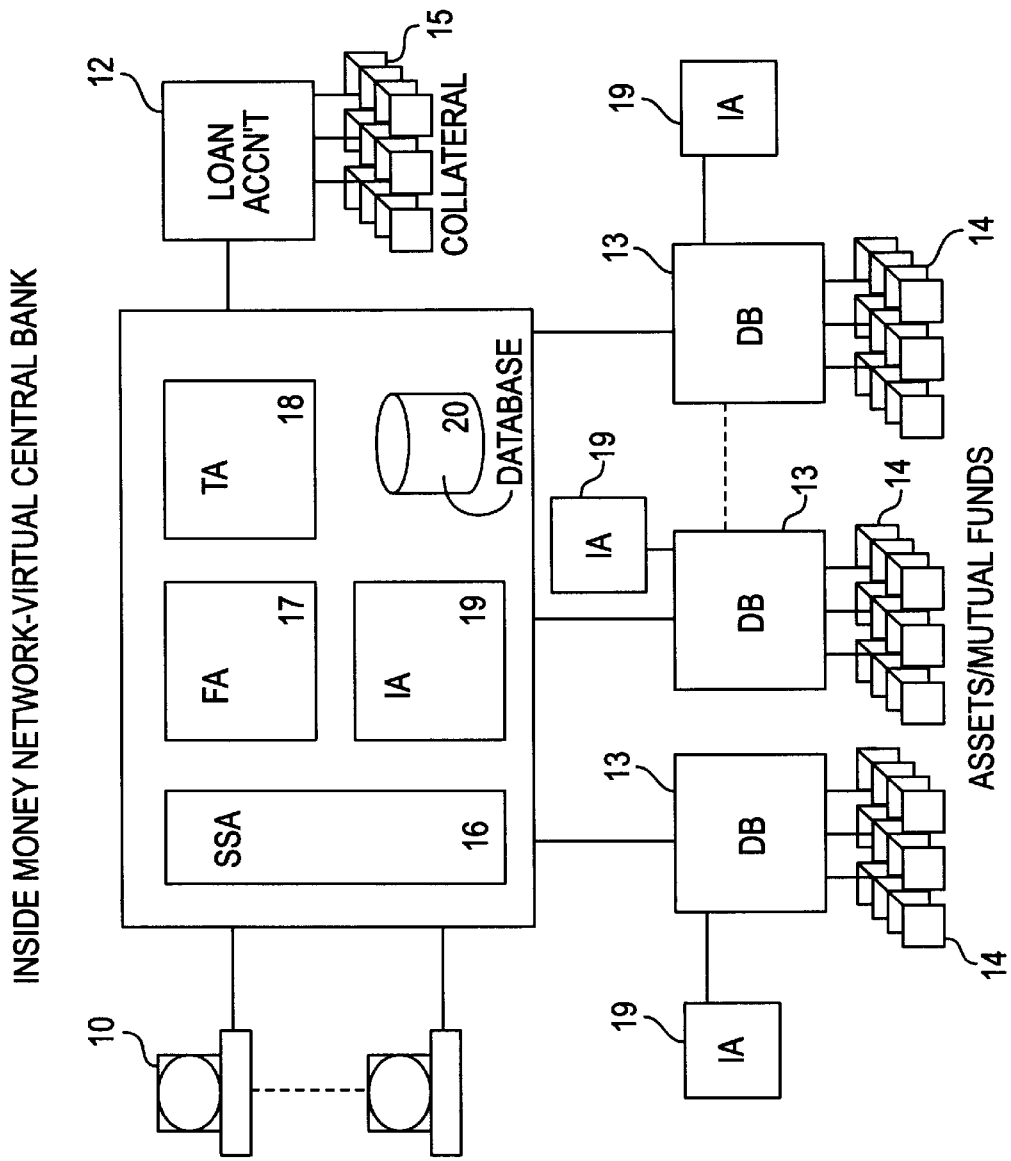
FIG. 3 is a diagram of an expanded Inside Money network.
Figure 4:
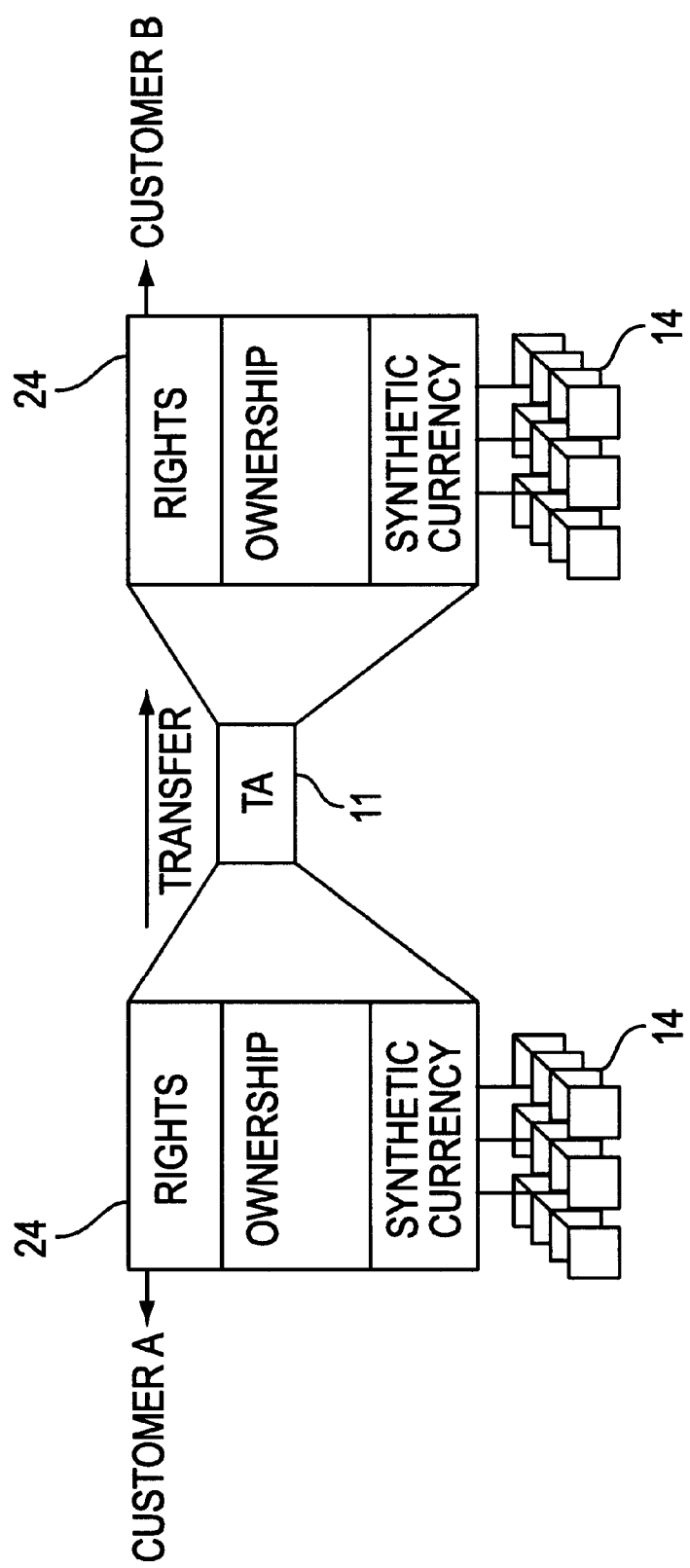
FIG. 4 shows the components of a share transfer.

Inside Money (IM) is a synthetic currency transaction network that includes multiple mutual funds, a means for connecting potential borrowers to potential lenders of IM shares, and methods and techniques for conducting private IM share transactions in either an on-line or off-line environment or a hybrid thereof. The IM system allows users to conduct transactions in a 24 hour international network with near real-time finality of transaction. Moreover, IM participants may lend and borrow IM shares from each other based on a borrower's loan rating and a participant lender's decision. Furthermore, IM participants can buy IM shares on margin based on collateral. This collateral can be tracked in an off-line or on-line environment. IM shares act as tradable synthetic currencies. The Inside Money network thus results in a global "super" virtual central bank.

The IM synthetic currency is created by pooling and dividing into shares a portfolio of highly liquid assets and by frequent evaluation and disbursements of dividends on those assets so as to hold the value of the IM share at unity with the underlying currency (e.g., one IM share=one dollar). In an extended scenario, by mutual agreement from all participants, these participation units can also be allowed to rise and fall in value as with any other currency. A computer system calculates and executes the transactions necessary to maintain the IM share cost at unity and calculates and executes the transactions necessary to keep the portfolio sufficiently liquid while maintaining a high rate of return. Synthetic currency transactions are transactions within a specially created system structure which allows participants to conduct fund transfers with the finality of cash settlement.

IM synthetic currency transactions have several advantages over traditional cash transactions. First, IM synthetic currency continuously pays the holder a competitive interest rate. Thus, IM is a new form of "cash" that has the finality of transaction available with cash and an interest earning feature available with an asset. Second, the IM network reduces transaction delays by bypassing multiple banking systems. Thus, IM earns interest for the holder while the IM cash is transferred. Third, since IM is not liquidated during a transaction, IM can continuously pay interest throughout the entire transaction.

The IM transaction network provides a lending and borrowing sub-system that arranges credit for IM users and provides an opportunity for higher returns for the IM lender. An IM lender may loan IM while retaining the interest earning future of IM, to a borrower and require the borrower to pay additional interest such as IM+some %. All lines of credit are fully collateralized. The use of fully backed loans keeps the IM system liquid, stable and all transactions final. Moreover, it provides a pooled matching service between IM lenders and qualified IM borrowers.

The pooling matching service may also disclose the rating of a potential lender and a potential borrower. For example, a potential borrowers' rating may be AA or AAA or the like. This rating may be disclosed to a potential IM lender and the IM lender can then approve or disprove a loan to the borrower based on the rating service and other factors. When a loan is made an IM lender can choose to retain the interest bearing features of IM and negotiate an interest payment from the borrower. For example, company A could loan IM shares to Company B, for Company B to pay IM to Company C; Company A and B may negotiate a rate of return, for example, IM plus some additional % which would be the IM return plus some additional percent of the value of IM that Company B must pay to Company A for borrowing the IM. The system of the present invention provides a means to track who holds IM, who receives the interest due on the IM and which participants owe points to the other participants.

A combination of sliding loan rates and transaction fees provide users with incentive to execute IM transactions as soon as possible. This creates a transaction environment with a more evenly distributed transaction arrival rate over the business day.

The IM transaction agent system in conjunction with the IM synthetic currency act like a "super" virtual central bank to allow users around the world to make near real-time final transactions.

All components of the IM system unless otherwise noted are computer controlled and managed processors with specific functionality. Functions may include a transfer agent function, a fund accountant function, an investment advisor function, a shareholder service agent function, and a database or record management server function. It is understood that the described functionality may be implemented on a single computer programmed to implement the described functionality, or in multiple computers deployed in a network.

The IM system includes user workstations, computer processors, account database(s), and communication links to the external financial computer infrastructure.

The complete IM network allows users to trade in pools of mutual fund shares. The IM network saves a participant money because the network converts the transactions from a gross settlement system (all transactions done directly with the mutual fund thereby incurring the maximum mutual fund transaction fee) to a periodic net settlement system (the network conducts a few net transactions with the mutual fund). The network maintains this ability by establishing (through the analysis of past transaction flow) a high and low margin of shares necessary to absorb the internal dynamics of gross settlement trading within an external net settlement trading system. The necessary margin pool is collateralized by users collectively designating a certain percentage of shares to cover outstanding transactions. For example, a 5 percent collective designation may establish a sufficient margin so that the trading pool need reconcile a low or high share balance (e.g. exceeding the pool margins) with the underlying mutual fund only 1 in every 10 transactions.

The Transaction Agent

As shown in figures one and two, the Transaction agent has five primary functions (1) a Transfer agent, 18 (2) a Fund Accountant, 17 (3) a Investment Advisor; 19 (4) a Shareholder Service Agent 16, and (5) a database 20 or record management server.

The Transfer agent (TA) 18 performs book-entry (i.e. changes to accounts) to user accounts. The TA 18 checks, approves, and makes final all network transactions. The parameters checked before a transaction is approved include the number of IM shares in the pool, lines of credit, whether a share is marked as "loanable", and whether a transaction is marked as contingent on another transaction.

The TA 18 under the expanded system conducts all the above and is able to perform transactions on and with pools of mutual fund shares.

The Fund Accountant (FA) 17 calculates IM's rate of return and advises the TA to take the actions necessary to hold the value of the IM share at unity 23 with the underlying currency. IM share holders can choose whether IM dividends should purchase more IM shares or be deposited into cash accounts.

The FA 17 also updates exchange rates for transfers between different synthetic currencies such as a transfer between IM (dollars) and IM (Yen).

Under the expanded system the FA updates the price of mutual fund shares and calculates exchange rates for transfers between the funds.

The Investment Advisor (IA) 19 upon a request to create or liquidate IM from the TA 18, directs as to what particular (short, medium, or long term) investments should be purchased or sold to maintain IM's high rate of return and high liquidity. This is similar to a treasury function. The IA 19 also re-invests mature investments into other investments to maintain the IM investment mix. The IA 19 processes advanced notice on large IM buy or sell orders by acting as necessary to minimize the cost of IM creation or liquidation.

Under the expanded system the IA 19 could offer advice as to what average return rate mutual funds or other financial instrument(s) provide. The IA 19 could establish a unit of participation that is derived from a combination of different mutual funds, securities, notes, letters of credit, trade invoices, and other electronic commerce. In that case the IA 19 would function like the IM IA 19 by keeping the pool (the derivative mutual fund) strategically invested in the underlying mutual funds and other financial instruments.

Rather than to manage to a unit value by mutual agreement from all the participants, the participant units can also be allowed to rise and fall in value as with any other currency.

The Shareholder Service Agent (SSA) 16 provides the interface between the network user and the system. It processes customer inquires as to the state of a transaction, account balances, and passes other commands through to the appropriate functional element. The SSA 16 also provides the hard-copy record of transaction to the user as required by securities regulation.

A database 20 is maintained by the system. The database records include account balances, collateralized lines of credit, transaction records, rates of returns, exchange rates, pricing information, audit trials, "loanable" IM, amounts owned/loaned, and collateral valuation.

The Loan Accountant

The Loan Accountant (LA) 12 establishes credit lines for IM users. All credit lines are fully collateralized. The LA 12 verifies a first lien on the collateral 15 and assess daily the value of the collateral 15. The LA can require additional deposits or margin to compensate for collateral 15 short falls.

The LA calculates the rate of return for the pool of IM "loanable" shares and distributes the interest acquired from the loaned IM to the loan pool. A number of loan return and priority schemes are available. One possible scheme is to evenly prioritized and evenly distribute the proceeds to the loan pool. The LA 12 requests the FA distribute the interest proceeds.

The LA 12 is responsible for the collection of all debts and fees associated with the system's lending and borrowing function.

In the expanded IM system the LA's 12 functionality (collateral 12 evaluation and pooled loan return) could be more closely linked to the multiple funds traded on the network, e.g. a mutual fund share in the system could be easily evaluated and secured as collateral for the IM credit line.

Some or all of the LA 12 system or functionality can also be contained within the transaction agent 11.

The Deposit Bank

The Deposit Bank (DB) 13 acts as account custodian for the assets 14 underlying IM. It also conducts banking functions for the transaction agent.

Referring now to Figure three, under the expanded system the several DBs 13 act as the custodians of other assets/ mutual funds 14. These assets/mutual funds 14, while traded on the IM system, are governed by there own IA's 19, investment criteria, and transaction fees. The IM trading system provides a higher return on these funds because transactions conducted within the IM network margins are conducted solely within the IM system thereby avoiding the transactions fees associated with buying and selling the mutual fund directly. Thus, IM conducts net transactions with the assets/mutual fund 14 and passes the savings (i.e. the costs that would have incurred from gross transactions with the mutual fund) to the IM user.

Operations

The Transaction agent may conduct three sets of transactions (1) client transactions, (2) fund management transactions, and (3) mutual fund transactions.
Client Transactions The client transaction set includes: (1) buy IM shares, (2) sell IM shares, (3) transfer IM, and (4) exchange IM. As stated above, the loans rates and transactions costs are calculated with a sliding rate. The sliding rate encourages users to execute a transaction as soon as possible.

The transfer of money into the IM network uses the following steps. Cash is transferred from a Central Bank System (e.g. the Fed Wire) to a transaction agent account. If sufficient IM shares are available in the margin pool, then the TA 18 transfers the cash into IM shares. If sufficient IM shares are not available in the pool, then the TA 19 transfers the cash to the IA 19 and requests an increase in the size of the IM pool. (The IM share is always held at unity with the underlying currency). The IA 19 makes a decision as to what assets are required by the IM pool (e.g. short, medium, or long term) and executes buy or sell order(s) to the custodian 22. The custodian 22 debits the cash account accordingly. When the custodian 22 receives confirmation that the assets are under transaction agent control, the custodian 22 advises the FA on the new holdings and rate of return. The FA 17 calculates the new size and dividend on the IM pool and advises the TA 18 of the new IM pool size. The TA 18 now transfers the shares to the buyer's IM account.

The transfer of money from the IM network to an external cash account uses the following steps. The IM user enters the irrevocable payment instruction. The TA 18 checks the users IM account for sufficient shares. If insufficient shares are present the request enters a pending queue to await either (1) the receipt of sufficient shares or (2) if the automatic borrowing credits are available and if the instruction contains a request for the credit, then the transaction is cleared for finality and the users IM credit account is debited accordingly. When sufficient IM shares are received, the transaction is cleared for finality and the user IM account is debited accordingly. If the IM pool is below its high margin mark or the IM shares are returned to the pool. If the IM pool is above its high margin the IA 19 is advised to liquidate the appropriate amount of IM from the pool. The IA 19 makes a decision as to what assets 14 are required by the IM pool (e.g., short, medium, or long term) and executes buy or sell order(s) to the custodian 22. Upon confirmation of the asset 14 sale, the custodian 22 credits the cash account accordingly. When the custodian 22 receives confirmation that the assets 14 are redeemed. The custodian 22 advises the FA 17 on the liquidated holdings. The FA 17 calculates the new size and dividend on the IM pool and advises the TA 18 of the new IM pool size. The TA 18 now electronically transfers the cash to the user's designated external account.

The IM transfer feature allows users to transfer (with finality of settlement) IM shares between each others accounts.

The IM Exchange feature allows a user to exchange between different types of IM at prevailing currency exchange rates. For example, a user could exchange his IM(Dollars) to IM(Yen) at the current currency exchange rate.
Management Transactions The management transaction set includes transactions necessary to provide gross supply and demand requirements for IM shares and cash pay out. The IM network has substantial margins in all accounts, however, a large movement of supply and demand for IM shares must be satisfied by the creation or liquidation of IM shares. Accordingly, the system can automatically order the creation or liquidation of IM shares. The network has structural incentives (e.g. sliding loan rates and transaction fees) for users to advise the network in anticipation of large IM buy or sell orders. This allows the network to optimize the internal IM supply and demand with large changes in the total IM pool. Furthermore, it allows the network to create or liquidate IM in the most cost efficient manner.

The FA 17 continuously monitors and calculates the dividends required to hold IM at unity with its underlying currency. Moreover, the FA 17 will pay dividends in either cash (in which case the TA 18 must be invoked to transfer the money to a cash account) or IM shares (in which case the low margin mark for the IM pool must be checked and IM created as necessary).
Mutual Fund Transactions The expanded IM network allows users to trade mutual fund shares from a pool of such shares. So long as the quantity of shares does not exceed the margin of the pool, the transaction is contained within the IM network. The IM network performs net adjustment to the mutual fund pool size only when necessary. The custodian 22 and FA 17 update the price of the mutual fund shares. For example, an expanded network might have three pools an IM synthetic currency pool, a Magellan mutual fund share pool, and a Kempfer mutual fund share pool. Network users can buy and sell into the mutual fund pools using the IM currency.

A Buy and Sell Bulletin Board System

The IM network provide an electronic bulletin board system (eg. via intra or internet access) wherein those participants who wish to loan IM shares may note their availability and those participants that wish to borrow IM shares may note the desire to buy IM shares creating a market or exchange. The bulletin board may disclose the rating of the prospective borrower company again, either AA, or AAA or junk. The prospective lender then may on a case-by-case basis approve or disapprove of who it lends its IM shares. The transaction agent system provides a means for transferring the IM shares to allow a prospective borrower to receive the shares by book entry and transfer the shares by book entry to a third party.

The Virtual Transaction Agent

A second embodiment of the present invention includes a virtual transaction agent wherein sufficient authentication and encryption techniques are used to encode IM shares, notes, letters of credit, trade invoices, or other electronic commerce onto electronic currency medium such as the e-cash medium or electronic smart cards or that disclosed in U.S. Pat. No. 5,455,407 to Rosen. A present limitation to the acceptance of smart card technology is the lack of interest earned on the stored value.

IM implementation on the e-cash medium may require, within the encrypted notation of the IM shares, a record of share transactions between individuals on their e-cards, a notation that the interest-bearing feature of IM was left on or "stripped" off, and a notation of lending points. The transactions of IM are recorded on the electronic representation of the IM share so that when the IM share is cashed out of the IM system, the IM shareholders may be paid the proper dividend accordingly to who owned title to the shares at any particular time. This allows the IM share, once created as e-cash/IM, to act as its own virtual transaction agent, that is tracking the ownership of the IM share and who is to receive the benefit of receiving the IM interest while the IM currency trades legal owners on the electronic cards or through the Internet. Thus, the e-cash/IM "token" virtual transaction agent feature allows a participant to strip the interest bearing feature of IM off of the IM token to enable Holder A to loan IM to Borrower B thus assuring Holder A the interest payment of IM during the loan period. Thus, one novel feature of the present invention is the creation of a synthetic currency that may be transferred between participants outside the transaction agent or within the so-called virtual transaction agent.

Another feature of the present invention is an enhanced fund accountant who more closely monitors a participants' collateral that is used to borrow into the IM network. This allows participants, namely corporations, to free-up capital based on underlying collateral to participate within the IM network. This provides companies that are asset rich but cash poor access to synthetic currency (cash), i.e., IM. This novel feature of the present invention thus allows a company participant to realize the wealth of the company by collateralizing corporate assets in exchange for IM currency.

Encrypted Stock and Asset Certificates

Another feature of the present invention is encrypted stock and asset certificates that can be used to buy inside money within a certain margin of the value of the asset. Although not disclosed or discussed in the Rosen patent's encryption and authentication schemes, such schemes may be used to create a novel electronic stock certificate. Such an electronic stock certificate is like a bearer instrument in that the individual that lawfully holds the certificate holds a "document" that gives title to the stock. The present invention, through the virtual transaction agent, may allow an individual to "buy" inside money up to a predetermined margin using the electronic stock certificate as collateral. Thus, the electronic "token" that represents inside money may also encode information about the collateral that was used to buy the inside money on margin. It is understood that after a predetermined amount of time inside money that was purchased on margin may require cover. The present invention provides a means for inside money bought on margin to "time out" and cover. The present invention also provides a means to secure the asset that was used as collateral to buy the inside money. Thus, the encrypted electronic stock certificate of the present invention provides a tamper proof means to attach or place a lien on the asset to indicate that the asset was used as collateral to buy inside money. The present invention also provides a means for the collateral to "time out" or liquidate to cover the inside money purchase. One means to track and secure the electronic stock certificates used to purchase inside money is to require the smart card that contains the electronic stock certificate to transfer preemptive rights to the stock to the transaction agent. The transaction agent thereby obtains the means of liquidating the stock, through the preemptive rights, to cover the inside money margin purchase.

We claim:

1. A synthetic currency transaction network performing transactions with near real time finality of transaction between potential borrowers and potential lenders, said synthetic currency created by pooling and dividing into shares a portfolio of highly liquid assets and by frequent evaluation and disbursements of dividends on those assets so as to hold the value of the synthetic currency share at unity with the underlying currency, said synthetic currency network comprising:

means for interfacing synthetic currency network users to said synthetic currency transaction network;

database means for storing and maintaining records and other information used by said synthetic currency transaction network;

transaction management means operatively connected to said means for interfacing and said database means for managing network users' accounts and all network transactions;

fund accounting means operatively connected to said transaction management means for managing network information regarding said synthetic currency;

deposit bank means which acts as custodian for said portfolio of highly liquid assets which underlie said synthetic currency;

investment management means operatively connected to said transaction management means and said deposit bank means for managing the measure of synthetic currency and directing investment decisions; and loan accountant means operatively connected to said transaction management means for managing all lending and borrowing activities in said synthetic currency transaction network.

2. The network of claim 1 wherein said means for interfacing processes customer inquires and provides a hard-copy record of the transaction.

3. The network of claim 1 wherein said records comprise one or more of account balances, collateralized lines of credit, transaction records, rates of returns, exchange rates, pricing information, audit trials, loanable synthetic currency, amounts owed, amounts loaned, and collateral valuation.

4. The network of claim 1 wherein said means for fund accounting calculates said synthetic currency transaction network's rate of return, updates exchange rates for transfers between different synthetic currencies, and gives instructions to initiate actions to hold the value of said synthetic currency share at unity with the underlying currency.

5. The network of claim 1 wherein said means for transaction management is responsive to perform changes to said network users' accounts.

6. The network of claim 1 wherein said means for transaction management is responsive to initiate actions to hold the value of said synthetic currency share at unity with the underlying currency, if instructed to by said fund accounting means, by requesting creation or liquidation of said synthetic currency.

7. The network of claim 1 wherein said means for transaction management is responsive to check, approve, and making final all network transactions.

8. The network of claim 1 wherein said means for investment management is responsive to receive requests from said transaction management means to create or liquidate synthetic currency.

9. The network of claim 1 wherein said means for investment management is responsive to direct as to what particular investments should be purchased or sold.

10. The network of claim 1 wherein said means for investment management is responsive to re-invest mature investments.

11. The network of claim 1 wherein said means for investment management is responsive to processes advanced notice on large synthetic currency buy or sell orders.

12. The network of claim 1 wherein said loan accountant means is responsive to establish credit lines for synthetic currency users.

13. The network of claim 1 wherein said loan accountant means is responsive to calculate the rate of return for the pool of synthetic money loanable shares.

14. The network of claim 1 wherein said loan accountant means is responsive to distribute the interest acquired from the loaned synthetic money to the loan pool.

15. The network of claim 1 wherein said loan accountant means is responsive to collect all debts and fees associated with the system's lending and borrowing function.

16. The network of claim 1 wherein said loan accountant means arranges for credit for said synthetic currency network users.

17. A virtual synthetic currency transaction agent where authenticated and encrypted synthetic currency shares are encoded onto an electronic currency medium, said agent comprising:

means for interfacing said synthetic currency transaction agent to other synthetic currency transaction agents;

means for storing and maintaining information regarding past transactions and ownership of said synthetic currency transaction agent;

means for tracking information regarding the interest on said synthetic currency, said information including the current owner of the interest and its value;

means for tracking dividends regarding said synthetic currency; and means for tracking the points charged for the lending of said synthetic currency.

18. A method of performing a virtual synthetic currency transaction, said method comprising:

transferring currency to a deposit bank;

acquiring a portfolio of highly liquid assets by said deposit bank;

creating synthetic currency by dividing said assets into synthetic currency shares;

executing transactions necessary to maintain said portfolio sufficiently liquid while maintaining a high rate of return;

authenticating and encrypting said synthetic currency shares;

encoding said authenticated and encrypted synthetic currency shares onto an electronic currency medium;

transferring said synthetic currency by transferring said synthetic currency shares from one said electronic currency medium to one or more other said electronic currency medium; and updating each said electronic currency medium to reflect said transfer.

19. The method of claim 18 wherein said electronic currency medium is e-cash.

20. The method of claim 18 wherein said electronic currency medium is electronic smart cards.

21. A method of performing synthetic currency transactions with near real-time finality of settlement between users, said method comprising:

transferring currency from a network wire to a user's account;

acquiring a portfolio of highly liquid assets, said assets used to create a pool of assets;

creating synthetic currency;

processing a user's request for one or more said synthetic currency transactions;

updating said user's account to reflect the net result of said processing of said user's request;

calculating and executing transactions necessary to maintain said synthetic currency share cost at unity; and calculating and executing transactions necessary to maintain said portfolio sufficiently liquid while maintaining a high rate of return.

22. The method of claim 21 further comprising the step of tracking who holds synthetic currency, who receives said interest due on said synthetic currency, and which said users owe points to other said users.

23. The method of claim 22 further comprising the step of paying said interest due.

24. The method of claim 21 further comprising the step of anticipating large synthetic currency transactions so as to create or liquidate synthetic currency automatically in the most efficient manner.

25. The method of claim 21 wherein said step of creating synthetic currency comprises dividing said pool of assets into synthetic currency shares.

26. The method of claim 21 wherein said step of processing a user's request further comprises matching synthetic currency lenders with qualified synthetic currency borrowers.

27. The method of claim 26 wherein the ratings of said lenders and said borrowers are disclosed.

28. The method of claim 26 wherein said lender retains the interest bearing features of said synthetic currency.

29. The method of claim 26 wherein said lender negotiates an interest payment from said borrower.

30. The method of claim 21 wherein said step of creating synthetic currency comprises frequently evaluating and disbursing dividends on said pool of assets to hold the value of said synthetic currency shares at unity with the underlying said currency.

31. The method of claim 21 wherein said portfolio of highly liquid assets comprises one or more short, medium, or long range treasury instruments.

32. The method of claim 31 wherein said treasury instruments are mutual funds.

33. The method of claim 21 wherein said portfolio of highly liquid assets comprises one or more pools of highly liquid assets.

34. The method of claim 33 wherein said users are allowed to trade in said one or more pools of highly liquid assets shares.

35. The method of claim 21 wherein said step of processing said user's requests comprises buying into said synthetic currency.

36. The method of claim 35 wherein said user's request to buy into said synthetic currency comprises:
   transferring said currency received from said network wire to a cash account;
   verifying sufficient said synthetic currency shares are available in said pool of assets and performing one of the following:
   transferring said currency into said synthetic currency shares if sufficient said synthetic currency shares are available, or
   increasing the size of the pool by acquiring new assets if insufficient said synthetic currency shares are available;
   calculating the new size and dividend on said pool of assets and the new rate of return; and
   transferring said synthetic currency shares to said user's synthetic currency account.

37. The method of claim 21 wherein said step of processing said user's requests comprises divesting from said synthetic currency.

38. The method of claim 37 wherein said user's request to divest from said synthetic currency comprises:
   receiving payment request instruction from said user;
   verifying said users' synthetic currency account has sufficient said synthetic currency shares and performing one of the following:
   holding said payment request in pending queue until receipt of sufficient said shares, if insufficient said shares are available, or
   clearing transaction for finality and debiting said users' synthetic currency account accordingly, if sufficient said shares are available;
   returning said shares to said pool if said pool is below its high margin;
   liquidating appropriate of said assets from said pool if said pool is above its said high margin;
   confirming sale of said assets and crediting cash account accordingly;
   calculating new size and dividend on said pool; and
   transferring, electronically, cash to user's designated external account.

39. The method of claim 21 wherein said step of processing said user's requests comprises transferring said synthetic currency.

40. The method of claim 21 wherein said step of processing said user's requests comprises exchanging said synthetic currency.

41. The method of claim 21 wherein said step of processing said user's requests comprises checking and approving said synthetic currency transaction.

42. The method of claim 41 wherein said checking comprises checking one or more of:
   the synthetic currency shares in the pool;
   lines of credit;
   whether share is loanable; and
   whether transaction is contingent on another transaction.

43. The method of claim 21 wherein said first step of calculating and executing comprises maintaining a margin pool of shares necessary to absorb the internal dynamics of performing said synthetic currency transactions to save said user money by converting said transactions from a gross settlement system to a periodic net settlement system.

44. The method of claim 43 wherein said pool is collateralized by users designating a certain percentage of shares to cover outstanding transactions.

45. The method of claim 21 wherein said users comprise potential borrowers and potential lenders of synthetic currency.

46. The method of claim 21 wherein said method continuously pays the holder of said synthetic currency a competitive interest rate.

47. The method of claim 21 wherein said method reduces transaction delays by bypassing multiple banking systems.

48. The method of claim 21 wherein said method continuously pays said interest throughout the entire transaction.

* * * * *